United States Patent [19]

Nowakowsky et al.

[11] Patent Number: 4,769,427
[45] Date of Patent: Sep. 6, 1988

[54] CONTINUOUS PREPARATION OF FINELY DIVIDED GEL-LIKE CROSSLINKED POLYMERS

[75] Inventors: Bernhard H. Nowakowsky, Ludwigshafen; Juergen Beck, Mannheim; Heinrich Hartmann, Limburgerhof; Christos Vamvakaris, Kallstadt, all of Fed. Rep. of Germany

[73] Assignee: BASF Aktiengesellschaft, Rheinland-Pfalz, Fed. Rep. of Germany

[21] Appl. No.: 921,388

[22] Filed: Oct. 22, 1986

[30] Foreign Application Priority Data

Oct. 19, 1985 [DE] Fed. Rep. of Germany ....... 3537276

[51] Int. Cl.⁴ .......................... C08F 2/24; C08F 20/06; C08F 20/56
[52] U.S. Cl. ........................................ 526/64; 526/88; 526/240; 526/263; 526/306; 526/307.7; 526/321; 526/323.2; 526/920; 422/137
[58] Field of Search ................... 526/64, 68, 240, 263, 526/306, 307.7, 323.2, 321; 422/137

[56] References Cited

U.S. PATENT DOCUMENTS 3,536,680 10/1964 Illing ...................................... 526/88
4,487,897 12/1984 Matsuoka et al. ..................... 526/88

FOREIGN PATENT DOCUMENTS 3030541 2/1982 Fed. Rep. of Germany ........ 526/88
0034101 2/1982 Japan ..................................... 526/88
2146343 4/1985 United Kingdom .................. 526/88

Primary Examiner—Joseph L. Schofer
Assistant Examiner—F. M. Teskin
Attorney, Agent, or Firm—Oblon, Fisher, Spivak, McClelland & Maier

[57] ABSTRACT

Finely divided, gel-like crosslinked polymers are prepared by a continuous method in which a monomer mixture which contains, per 100 parts by weight of acrylic acid or methacrylic acid, from 50 to 100 mol % of which in each case are neutralized, acrylamide, methacrylamide or N-vinylpyrrolidone, from 0 to 30 parts by weight of other water-soluble monoethylenically unsaturated monomers and from 0 to 20 parts by weight of water-insoluble monoethylenically unsaturated monomers is copolymerized with from 0.01 to 5 parts by weight of a crosslinking agent, in 20–65% strength by weight aqueous solution in the presence of an initiator at from 45° to 95° C. in a single-screw cylindrical mixer whose stirrer shaft possesses disk segments which have, at the outer end, mixing bars which are arranged in a manner such that the substances fed in at the entrance of the mixer are conveyed in the axial direction to the exit of the mixer, the aqueous monomer solution in the mixer is polymerized under from 100 to 800 mbar, and some of the water is removed during the polymerization, so that a crumb-like gel having a solids content of from 30 to 70% by weight is discharged.

4 Claims, 1 Drawing Sheet

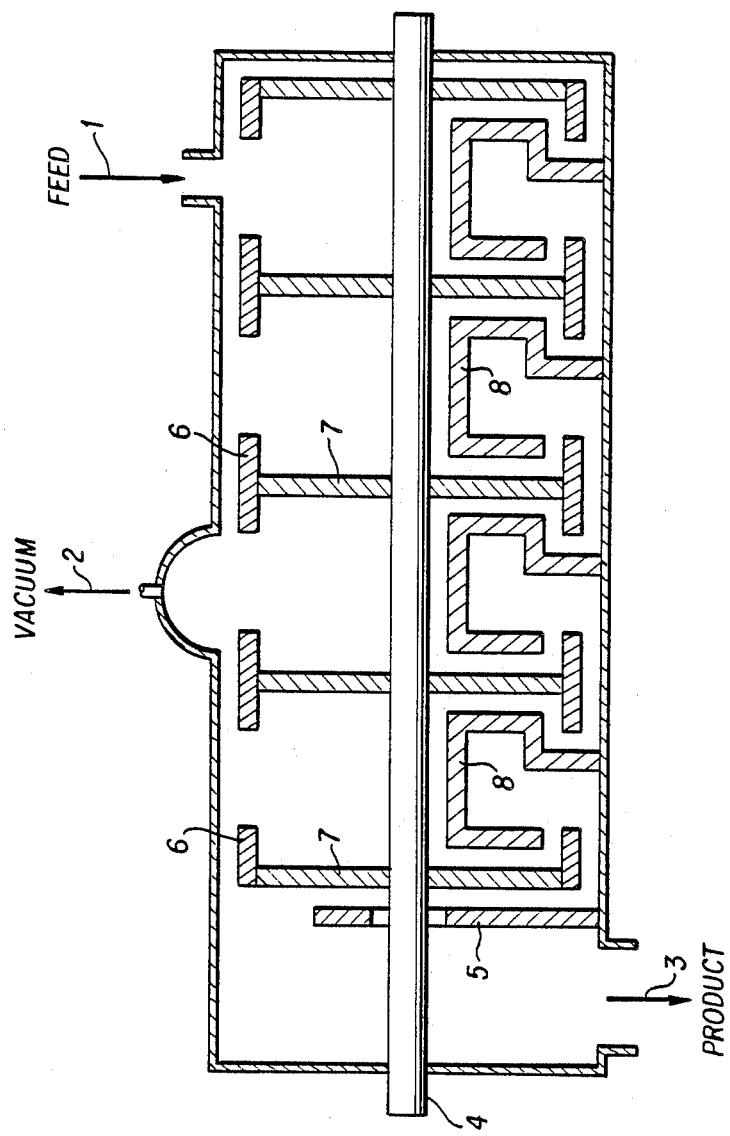

CONTINUOUS PREPARATION OF FINELY DIVIDED GEL-LIKE CROSSLINKED POLYMERS

German Laid-Open Application DOS 3,432,690 discloses a process for the continuous preparation of crosslinked polymers, in which water-soluble monomers are polymerized in the presence of a crosslinking agent and an initiator in a kettle which is equipped with a plurality of parallel rotating stirrer shafts provided with stirrer blades. The polymerization is carried out continuously in a two-arm kneader or, for example, in a three-shaft kneader. The polymerization temperature is preferably from 70° to 100° C. In this type of reactor, extensive backmixing takes place, so that the monomer solution is introduced on to the finely divided water-containing polymer gel, and polymerization of the monomer takes place on the surface of the polymer gel. The finely divided polymer gels which can be prepared in this manner have a relatively high residual monomer content and contain substantial amounts of extractable, i.e. soluble components. They have to be subjected to a separate process step comprising further polymerization and further crosslinking.

It is an object of the present invention to provide a continuous process for the preparation of finely divided, gel crosslinked polymers, in which polymers having a relatively low residual monomer content and containing small amounts of extractable components are obtained.

DESCRIPTION OF THE DRAWING

The FIGURE depicts an apparatus suitable for the practice of the claimed invention in which:
1 indicates the feed
2 indicates a vacuum
3 indicates the product
4 indicates a stirrer shaft
5 indicates a barrier
6 indicates mixing bars
7 indicates disk segments
8 indicates counterhooks We have found that this object is achieved, according to the invention, by a process for the continuous preparation of finely divided, gel crosslinked polymers by copolymerization of a monomer mixture which contains, per 100 parts by weight of one or more monomers from the group consisting of (a) acrylic acid and methacrylic acid, from 50 to 100 mol % of which in each case is neutralized with an alkali metal or ammonium base, and acrylamide, methacrylamide and N-vinylpyrrolidone, (b) from 0 to 30 parts by weight of other water-soluble monoethylenically unsaturated monomers, (c) from 0 to 20 parts by weight of water-insoluble monoethylenically unsaturated monomers and (d) from 0.01 to 5 parts by weight of a monomer containing two or more ethylenically unsaturated double bonds as a crosslinking agent, in 20–65% strength by weight aqueous solution in the presence of an initiator at from 45° to 95° C., if the aqueous solution of the monomers together with the initiator is fed continuously to a single-screw cylindrical mixer whose stirrer shaft possesses disk segments which possess, at the outer end, mixing elements which are arranged in a manner such that substances introduced at the entrance of the mixer are conveyed in the axial direction to the exit of the mixer, the aqueous monomer solution is polymerized in the mixer under from 100 to 800 mbar, and some of the water is removed during the polymerization, so that crumb-like gel particles having a solids content of from 30 to 70% by weight are discharged at the exit of the mixer.

Suitable monomers of group (a) are acrylic acid and/or methacrylic acid, from 50 to 100 mol % of which in each case are neutralized with an alkali metal or ammonium base, and acrylamide, methacrylamide and N-vinylpyrrolidone. For partial or complete neutralization of the acrylic acid or methacrylic acid, sodium hydroxide solution or potassium hydroxide solution are preferably used. The neutralization can of course also be effected using sodium carbonate, potassium carbonate, ammonia or a substituted amine, such as trimethylamine, tri-n-octylamine or triethanolamine. The monomers of group (a) can be used in the copolymerization either alone or as a mixture with one another in any ratio. For example, monomer mixtures of acrylic and methacrylic acid, of acrylic acid and acrylamide, of acrylic acid, acrylamide and methacrylamide or of acrylamide and N-vinylpyrrolidone may be subjected to the copolymerization. However, acrylic acid which has been neutralized to a degree of 50–100 mol % with sodium hydroxide solution or potassium hydroxide solution is preferably used as the monomer of group (a).

Group (b) consists of other water-soluble monoethylenically unsaturated monomers. These include, for example, maleic acid, fumaric acid, crotonic acid, itaconic acid, vinylsulfonic acid, vinylpyridinium salts, N-vinylformamide, basic acrylates and methacrylates in the form of the salts with strong mineral acids or in quaternized form, e.g. dimethylaminoethyl acrylate, diethylaminoethyl acrylate, dimethylaminopropyl acrylate, dimethylaminobutyl acrylate, diethylaminoethyl methacrylate, dimethylaminoethyl methacrylate and dimethylaminopropyl acrylate. This group of monomers also includes the hydroxyalkyl acrylates and hydroxyalkyl methacrylates, e.g. hydroxyethyl acrylate, hydroxyethyl methacrylate, hydroxypropyl acrylates, hydroxypropyl methacrylates, hydroxybutyl acrylates and hydroxybutyl methacrylates, as well as acrylates and methacrylates obtained by esterification of polyethylene glycols with acrylic acid or methacrylic acid in a molar ratio of 1:1. From 0 to 30 parts by weight of the monomers of group (b) are used per 100 parts by weight of the monomers of group (a).

The monomers of group (c) include water-insoluble monoethylenically unsaturated monomers. These are, for example, the esters of acrylic acid or methacrylic acid with monohydric alcohols of 1 to 18 carbon atoms, e.g. methyl acrylate, ethyl acrylate, propyl acrylate, isopropyl acrylate, butyl acrylate, hexyl acrylate, 2-ethylhexyl acrylate or stearyl acrylate, the corresponding esters of methacrylic acid, diethyl fumarate, acrylonitrile and methacrylonitrile, vinylacetone and vinyl propionate. In the copolymerization, from 0 to 20 parts by weight of the monomers of group (c) are employed per 100 parts by weight of the monomers of group (a).

The monomers of group (d) include crosslinking agents which contain two or more ethylenically unsaturated double bonds, e.g. N,N'-methylenebisacrylamide, polyethylene glycol diacrylates and polyethylene glycol dimethacrylates, each of which is derived from a polyethylene glycol having a molecular weight of from 126 to 8500, trimethylolpropane triacrylate, trimethylolpropane trimethacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane which are diesterified or triesterified with acrylic acid or methacrylic acid, pentaerythritol or glycerol which is diesterified or polyesterified with acrylic acid or methacrylic acid, triallylamine, tetraallylethylenediamine, divinylbenzene, diallyl phthalate, polyethylene glycol divinyl ether, trimethylolpropane diallyl ether and divinylethylene urea. The monomers of group (d) are used in the copolymerization in an amount of from 0.01 to 5 parts by weight per 100 parts by weight of the monomers of group (a). The crosslinking agents are preferably employed in an amount of from 0.1 to 3 parts by weight per 100 parts by weight of the monomers (a).

The monomers are polymerized in aqueous solution. Where they are used in the copolymerization, the water-insoluble monomers can be finely dispersed in the aqueous solution with the aid of emulsifiers. Examples of suitable emulsifiers are oxyethylated nonylphenols, oxyethylated castor oil, alkylsulfates, sorbitan fatty acid esters, oxyethylated sorbitols, oxyethylated sorbitan fatty acid esters and alkylsulfonates.

The emulsifiers are used in an amount of from 0 to 3 parts by weight per 100 parts by weight of the monomer of group (a). The concentration of the aqueous monomer solution is preferably from 30 to 50% by weight.

Suitable initiators are mainly water-soluble compounds which form free radicals, for example azo initiators, such as 2,2'-azobis-(N,N'-dimethyleneisobutyramidine) dihydrochloride, 2,2'-azobis-(2-amidinopropane) dihydrochloride, 2,2'-azobis-(N,N'-dimethyleneisobutyramidine), 4,4'-azobis-(4-cyanopentanecarboxylic acid) or 2-carbamylazoisobutyronitrile, and dibenzoyl peroxide, dilauryl peroxide, di-2-ethylhexyl peroxidicarbonate, dicyclohexyl peroxidicarbonate, bis-(4-tertbutylcyclohexyl) peroxidicarbonate, tert-butyl perpivalate, tert-butyl perbenzoate, tert-butyl permaleate, ditert-butyl peroxide, tert-butyl hydroperoxide, hydrogen peroxide, ammonium persulfate, potassium persulfate, sodium persulfate and redox catalysts, suitable reducing components being iron(II) ammonium sulfate, ascorbic acid, sodium methylsulfinate, disodium disulfite and sodium bisulfite. The initiators can be used either alone or as a mixture. The rate of decomposition of the very rapidly decomposing peroxides can be reduced by the concomitant use of organic metal complexes, e.g. copper acetylacetonate, and can thus be adapted to the particular polymerization temperature selected. Redox catalysts consisting of one or more peroxides and a reducing agent are preferably used. The use of persulfates or peresters or mixtures of persulfates and peresters as a component of redox polymerization initiators is particularly preferred. The polymerization initiators are used in an amount of from 0.01 to 5, preferably from 0.2 to 3%, by weight, based on the monomers used in the polymerization.

In order to regulate the molecular weight of the polymers, it is also possible to carry out polymerization in the presence of a polymerization regulator, e.g. mercaptoethanol, mercaptopropanol, thioglycolic acid, dodecylmercaptan, formic acid or a halohydrocarbon, such as bromomethane or carbon tetrachloride. The polymerization regulators are used in an amount of from 0 to 3% by weight, based on the monomers employed in the polymerization.

The aqueous monomer solution, together with the initiator or several initiators, is fed continuously to a single-screw cylindrical mixer whose stirrer shaft possesses disk segments which have, on the outer end, mixing bars arranged in a manner such that the substances fed in at the entrance of the mixer are conveyed in the axial direction to the end of the mixer where, if required, a retarding disk is arranged. The retarding disk serves to regulate the level in the mixer. When a certain level in the mixer is reached, the free-flowing, non-tacky finely divided gel passes over the retarding disk to the discharge orifice, which is arranged laterally or in the bottom of that end of the mixer which is opposite the feed orifice. The finely divided gel can be discharged from the mixer by falling freely or by discharge aids attached to the stirrer shaft. A preferred mixer is one which does not contain any retarding disk and in which discharge takes place in a downward direction under the action of gravity.

The aqueous monomer solution may contain initiator in solution or dispersion. However, the initiators can also be fed to the single-shaft cylindrical mixer separately from the monomer solution. If required, the mixer can be heated and cooled. The monomer solution is polymerized therein at from 45° to 95° C. under from 100 to 800 mbar (absolute). Under these conditions, some of the water vaporizes in the mixer and is removed from the latter via the pressure regulating means. While the substances are in liquid form at the point at which the monomers are fed to the mixer, the consistency of the reaction mixture changes via a highly viscous state to a crumb-like gel, which is discharged at the exit of the mixer by the continuous conveying action of the mixer. The heat of polymerization is removed from the system by evaporating some of the water from the aqueous monomer solution. In the novel process, it is very easy to control the polymerization temperature by adjusting the pressure. The polymerization gives a gel, which is comminuted in the mixer to give a finely divided crumb-like gel and is then discharged as such. It is important that, during the polymerization in the mixer, only some of the water is removed, so that crumb-like gel particles having a solids content of from 30 to 70% by weight are obtained at the exit of the single-screw mixer. Where the gel has a higher solids content, the finely divided gel particles become compacted to give lumps which are difficult to convey and which would require a great deal of energy to comminute. The residence time of the reaction mixture in the single-screw mixer is from 5 to 60, preferably from 10 to 20, minutes.

The single-screw cylindrical mixer has a ratio of diameter to length of from 3:1 to 20:1. On the stirrer shaft, the disk segments are arranged in the form of a propeller. Distributed over all the lands of the stirrer shaft are from 2 to 25 of these disk segments, a disk segment consisting of from 2 to 7 individual elements which are arranged in the form of a propeller. The mixing elements, which are located on the outer end of the disk segments convey the mixture within the mixer at the stage of polymerization and at the same time prevent polymer gel from being deposited on the inner wall of the mixer, because the mixing elements pass close to the inner wall of the cylindrical mixer. Examples of suitable mixing elements are mixing bars which pass close to the walls or plowshare-type attachments. Counterhooks with flanges are also installed in the mixer in order to remove the gel formed during the polymerization from the disk segments of the stirrer shaft and from the mixing bars.

The crumb-like gel obtained in the single-screw mixer during the polymerization is then dried. The drying step can be effected by any conventional procedure, for example in a fluidized bed, on a through-circulation drying belt or a drying belt under reduced pressure or by means of microwave drying, or preferably under reduced pressure in a single-screw kneader with intensive kneading of the polymer gel. This drying step is preferably carried out in a single-screw or multi-screw kneader under from 5 to 300, preferably from 20 to 70, mbar and at 30° to 170° C. After drying, a free-flowing polymer gel which exhibits very high water absorption and can be used as a soil conditioner or absorbent in hygiene articles, e.g. diapers, is obtained. In the Examples, parts and percentages are by weight.

Determination of the absorptive capacity

In the Examples, the absorptive capacity for physiological saline solution of the gel prepared has been stated in each case. This was determined by enclosing 0.2 g of the polymer in a filter paper bag in the form of a teabag and immersing it in a 0.9% strength aqueous saline solution for 10 minutes. After subtracting the amount absorbed by the empty bag, the absorption of the polymer is calculated in each case.

Determination of soluble components

The content of soluble components which are not bound in the polymer network was determined by swelling the polymer in water for 8 hours and measuring the carbon content of the aqueous solution.

EXAMPLE 1

First, a monomer solution designated as feed 1 was prepared, this solution containing, per 1000 parts of aqueous solution, 392 parts of acrylic acid and sodium acrylate in a molar ratio of 1:3, 4 parts of N,N'-methylenebisacrylamide and 4 parts of ammonium persulfate. A solution of 3 parts of sodium bisulfite in 1000 parts of water was used as feed 2. Feed 1, with a throughput of 10,000 parts per hour, and feed 2, in an amount of 150 parts per hour, were pumped simultaneously into a 6 liter single-screw cylindrical mixer whose stirrer shaft possessed disk segments which had, on the outer end, mixing bars arranged in a manner such that the monomer solution fed in at the entrance of the mixer was conveyed in the axial direction to the exit of the mixer. The ratio of the diameter of the mixer to its length was 7:1. 8 disk segments were arranged 15 cm apart on each stirrer shaft, a disk segment consisting of three individual elements.

The stirrer shaft and the housing of the single-screw mixer were heated to 45° C. and the pressure inside the mixer was brought to 500 mbar. The polymerizing mixture present in the mixer had a maximum temperature of 84° C. Water was distilled off continuously from this mixture during the polymerization, so that a crumblike polymer having a solids content of 46% was obtained at the exit of the single-screw mixer. The mean residence time in the mixer was 20 minutes.

The resulting crumb-like gel was then dried to a solids content of 97.8% in a kneader at 80° C. and under 60 mbar.

One gram of the polymer obtained in this manner absorbed 52 g of physiological saline solution.

6% of soluble components were extracted by swelling in water.

EXAMPLE 2

A feed 1 which contained, per 1000 parts of aqueous solution, 250 parts of acrylic acid and sodium acrylate in a molar ratio of 1:3, 746 parts of water, 2 parts of N,N'-methylenebisacrylamide and 2 parts of ammonium persulfate, and a feed 2, which consisted of a solution of 3 parts of sodium bisulfite in 1000 parts of water, were prepared. 10,000 parts/hour of feed 1 and 50 parts/hour of feed 2 were pumped into the single-screw cylindrical mixer described in Example 1. The mixer was heated to 60° C. The polymerization was carried out under 200 mbar and at a maximum temperature of 63° C. The mean residence time was 40 minutes. A finely divided crumb-like gel having a solids content of 28% was obtained. The water-containing polymer was dried in a kneader at 170° C. under 150 mbar to a residual monomer content of 0.4%. 11% of soluble components were separated off after swelling in water. One gram of the polymer absorbed 46 g of physiological saline solution.

EXAMPLE 3

A feed 1 which contained, per 1000 parts of aqueous solution, 425 parts of acrylic acid and sodium acrylate in a molar ratio of 1:3, 570 parts of water, 2 parts of polyethylene oxide diacrylate having a molecular weight of 750, 2.5 parts of ammonium persulfate and 0.5 part of tert-butyl perbenzoate was prepared. A solution of 3 parts of sodium methylsulfinate in 1000 parts of water was used as feed 2. Feed 1, in an amount of 10,000 parts/hour, and feed 2, in an amount of 50 parts/hour, were fed simultaneously to the single-screw mixer described in Example 1, which was heated to 50° C. Under 200 mbar, the maximum polymerization temperature was 59° C. The mean residence time in the single-screw mixer was 25 minutes. A crumb-like gel which had a solids content of 47% was discharged at the exit of the mixer. The product was dried in a kneader at 80° C. under 10 mbar to a residual water content of 1.1%. The content of soluble components was determined as 7% after swelling in water. 1 g of the copolymer prepared in this manner absorbed 54 g of physiological saline solution.

EXAMPLE 4

A feed 1 which contained, per 1000 parts of aqueous solution, 495 parts of acrylic acid, potassium acrylate and acrylamide in a molar ratio of 1:3:1, 500parts of water, 2 parts of trimethylolpropane triacrylate, 2 parts of sodium persulfate and 1 part of tert-butyl permaleate, and a feed 2 consisting of 5 parts of ascorbic acid in 1000 parts of water, were prepared. Feed 1, in an amount of 10,000 parts/hour, and feed 2, in an amount of 50 parts/hour, were fed together to the single-screw mixer described in Example 1. The temperature of the mixer was brought to 50° C. The polymerization of the monomer solution was carried out in the mixer under 700 mbar at a maximum temperature of 95° C. The residence time of the reaction mixture was 12 minutes. A finely divided, crumb-like gel having a solids content of 54% was discharged at the exit of the single-screw mixer. After drying at 60° C. under 30 mbar, a product having a solids content of 97.5% was obtained. 1 g of the polymer gel prepared in this manner absorbed 56 g of physiological saline solution. 4% of soluble components were detected after swelling in water.

COMPARATIVE EXAMPLE

A monomer solution which contained, per 1000 parts of aqueous solution, 396 parts of acrylic acid and sodium acrylate in a molar ratio of 1:3 and 4 parts of N,N'-methylenebisacrylamide was heated to 45° C. under a nitrogen atmosphere in a 4 liter V2A stainless steel kneader possessing parallel kneading elements (in double fishtail form), by heating the kneader. At this temperature, 4 parts of ammonium persulfate were then added, and the mixture was homogenized. The polymerization was started by adding 0.4 part of sodium bisulfite in 4.6 parts of water. After a viscous phase had been passed through, the resulting gel-like polymer was divided up into fine particles by the shear action of the stirrer blades of the kneader. The maximum polymerization temperature was 93° C. The polymer gel prepared in this manner was dried at 180° C. in a through-circulation dryer, after which it absorbed 51 g of physiological saline solution per gram of polymer. It contained 41% of soluble components extractable by swelling in water.

We claim:

1. A process for the continuous preparation of a finely divided, gel crosslinked polymer by continuous copolymerization of a monomer mixture which contains, per 100 parts by weight of one or more monomers of the group consisting of
   (a) acrylic acid and methacrylic acid, from 50 to 100 mol % of which in each case is neutralized with an alkali metal or ammonium base, and acrylamide, methacrylamide and N-vinylpyrrolidone;
   (b) from 0 to 30 parts of weight of other water-soluble monoethylenically unsaturated monomers,
   (c) from 0 to 20 parts by weight of water-insoluble monoethylenically unsaturated monomers and
   (d) from 0.01 to 5 parts by weight of a monomer containing two or more ethylenically unsaturated double bonds as a crosslinking agent, in 20–65% strength by weight aqueous solution in the presence of an initiator at from 45° to 95° C. in a single-screw cylindrical mixer having a ratio of diameter to length of from 3:1 to 20:1 whose stirrer shaft possesses 2 to 25 disk segments which have, at the outer end, 2 to 7 individual mixing elements which are arranged in a manner such that the substances introduced at the entrance of the mixer are conveyed in the axial direction to the exit of the mixer, the aqueous monomer solution is copolymerized in the mixer under from 100 to 800 mbar, and some of the water is removed during the copolymerization, so that crumb-like gel particles having a solids content of from 30 to 70% by weight are discharged at the exit of the mixer.

2. A process as claimed in claim 1, wherein acrylic acid which has been neutralized to a degree of from 50 to 100 mol % with sodium hydroxide solution and/or potassium hydroxide solution is continuously copolymerized, as the monomer of group (a), with a monomer of group (d) which contains two or more ethylenically unsaturated double bonds.

3. A process as claimed in claim 1, wherein the residence time of the substances introduced at the entrance of the mixer in the mixer is from 5 to 60 minutes.

4. A process as claimed in claim 1, wherein N,N'-methylenebisacrylamide, polyethylene glycol diacrylates, trimethylolpropane triacrylate and/or butanediol diacrylate are used as crosslinking agents.

* * * * *